Patented June 19, 1951

2,557,678

UNITED STATES PATENT OFFICE 2,557,678

THIOPHENE PREPARATION FROM HYDROCARBONS, ALCOHOLS, OR MONOHALO HYDROCARBONS AND SULFUR DIOXIDE

Max Neuhaus, Pleasantville, Robert E. Conary, Beacon, and Lawrence W. Devaney, Fishkill, N. Y., assignors to The Texas Company, New York, N. Y., a corporation of Delaware No Drawing. Application July 2, 1946, Serial No. 681,138

6 Claims. (Cl. 260—332.8)

This invention relates to an improved process for the production of heterocyclic sulfur compounds and particularly to improvements in the production of thiophene and thiophene compounds, e. g., organic compounds containing a thiophene nucleus.

The utility and application of heterocyclic sulfur compounds have in the past been restricted in scope and considered solely from the standpoint of academic interest, due to the fact that economic and commercial methods of preparation were not available. Although various reactions have been proposed for the preparation of thiophene compounds, such reactions have been useful only for small scale laboratory preparations.

It has now been found that heterocyclic sulfur compounds, and particularly those containing a thiophene nucleus, can be synthesized from a large class of reactants in accordance with a new and improved catalytic process which is easily adapted to commercial operations.

This invention is predicated upon the discovery of an improved process for the production of thiophene and thiophene compounds, involving the reaction of an organic compound containing an aliphatic chain of at least two carbon atoms with an oxide of sulfur in the presence of a solid catalyst, whereby the reactants are charged in the vapor phase to a reaction zone in which the catalyst is maintained in a suspended or fluid state. The reaction of an organic compound containing an aliphatic chain of at least two carbon atoms and an oxide of sulfur is exothermic and apparently involves a complicated series of reactions in the formation of the thiophene compounds. In conducting this reaction particular care is necessary to maintain the desired course of reaction and avoid the dissipation of the charge compounds in undesirable collateral reactions and formation of decomposition products. It has been found that by conducting the reaction in a reaction zone in which the catalyst is maintained in a turbulent fluid state an accurate control of the reaction temperature and improved contact efficiency of the reactants and catalyst are obtained which permit increased per pass and ultimate yields of the desired thiophene compounds.

In carrying out the process of the invention, the reactants, in vapor form, are introduced in their prescribed mol ratio into a reaction chamber containing subdivided catalyst particles at a velocity at least sufficient to overcome the gravitational settling of the catalyst particles and maintain the majority of the catalyst particles in a fluid or turbulent suspended state. The minimum charge rate or space velocity of the reactants will vary with each unit operation and is a function of the size and density of the particular catalyst used. During operation of the process the reaction zone will consist of a relatively dense lower phase containing a high concentration of catalyst particles with a gradual transition to a light upper phase containing a low concentration of catalyst particles. For the sake of convenience of description the term "fluid" will be used hereinafter in the specification and claims as indicating a body of subdivided catalyst particles maintained in a turbulent suspended state in the reaction chamber.

The type of thiophene compounds produced by the reaction process is dependent to a large extent on the choice of charge stock used in the reaction. Although aryl-substituted and condensed thiophene compounds may be prepared, the process is especially applicable to the production of thiophene itself or to thiophene compounds possessing acyclic substitutents. To produce thiophene compounds of this class the charge material is preferably a saturated or unsaturated acyclic hydrocarbon having at least two aliphatic carbon atoms in a chain or a mixture of organic compounds containing a substantial proportion of hydrocarbons of this type. Low molecular weight hydrocarbons, such as are produced from the processing of petroleum or natural gas, constitute suitable charge stocks for the production of thiophene and the lower acyclic homologs. When acyclic hydrocarbons containing more than four carbon atoms are used in the reaction, acyclic homologs of thiophene, in which the remaining carbon atoms are present in one or more side chains, are the predominant product. There appears to be no upper limit on the number of carbon atoms the charge stock may contain, although they should be in vapor form under the reaction conditions. When relatively simple reaction products are desired, however, the hydrocarbons preferably should contain from two to ten carbon atoms.

The process also includes the use of charge stocks other than hydrocarbons, such as the substituted acyclic hydrocarbons containing at least two aliphatic carbon atoms in a chain. These substituted acyclic hydrocarbons should contain substituents which either remain stably attached to the compound during the reaction or which are removed during the reaction to form compounds which do not have a substantial adverse effect on the reaction. As examples of suitable compounds may be mentioned the aryl-substituted acyclic hydrocarbons or compounds, such as ethyl, propyl or butyl benzene or naphthalene, cyclo-aliphatic compounds, halogenated aliphatic compounds, such as chlorobutane or chloropentane, and saturated or unsaturated alcohols having at least two carbon atoms in the aliphatic portions thereof.

Although in general, sulfur oxides, such as sulfur dioxide or sulfur trioxide, may be used, the reaction is preferably conducted with sulfur dioxide. The oxides are usually employed in the free state, but they may be employed in the combined form such as in the form of their hydrates. The hydrates, for example, decompose at the temperature of reaction to yield a charge mixture comprising sulfur oxide and steam which serves as a diluent in the reaction mixture.

The heterocyclization process of the invention is conducted in the presence of a contact type solid catalyst which may be described chemically as a solid contact material of the class of oxides and sulfides which are stable under the conditions of reaction. Such catalysts include metal oxides which, under the conditions of reaction, may undergo conversion to the corresponding sulfide as, for example, molybdena. It is recognized that certain of the materials classified as catalysts for the subject reaction are relatively inert catalytically as applied to conventional hydrocarbon conversion reactions. Selection of the particular catalysts to be used would depend to a large extent upon the type of charge stock used in the reaction. Thus, in the reaction involving an organic compound containing a saturated aliphatic chain, it is preferable to select an active dehydrogenation catalyst. The solid contact catalysts usually preferred for general application with the majority of economical charge stocks are the amphoteric metal oxides and sulfides which are stable under the reaction conditions. Specific examples of the types of catalysts contemplated by the invention are silica, chromia, vanadia, molybdena, alumina, titania, magnesia, boria, molybdenum sulfide, nickel sulfide, tungsten sulfide, cobalt sulfide, tin sulfide, etc., as well as mixtures and chemical combinations thereof such as silica-alumina, chromia-alumina, vanadia-alumina, molybdena-alumina, acid-treated bentonitic clays, etc.

For application in the process of the invention these catalysts are formed or ground to the desired particle size. The particular particle size employed is dependent upon the density of the catalyst and the space velocity at which the reaction is to be conducted. For example, when a light catalyst (low density) is used, larger particle sizes may be employed for any given space velocity than when a heavy catalyst (high density) is used.

It will be recognized that the conditions of reaction required to obtain optimum yields of the particular thiophene compound desired will vary in accordance with the type of reactants and the catalyst used. As a general proposition, temperatures of at least 700° F., a space velocity (weights of charge compound per hour per weight of catalyst) of at least 0.2, and usually within the range of 0.2 to 6, and a mol ratio of sulfur oxide to the charge compound of at least 0.3, and usually within the range of 0.3 to 4, are required by the reaction process.

Particular conditions of reaction are best illustrated by reference to the conditions involved in the reactions of saturated and unsaturated acyclic hydrocarbons, such as butane and butane with sulfur dioxide in the presence of a chromia-alumina catalyst to produce thiophene. The saturated acyclic hydrocarbons are mixed in vapor form with sulfur dioxide in mol ratios of sulfur dioxide to hydrocarbon of at least 0.5 and introduced into the reaction chamber containing 100–200 mesh chromia-alumina catalyst at a space velocity within the range of 0.3 to 3 with the temperature of the reaction zone maintained within the range of 700 to 1400° F. With butane it is preferable to conduct the reaction at a mol ratio of around 1.5 to 3.0, a space velocity of about 0.6 to 1.2, and a reaction temperature of about 1100–1200° F. When charging an unsaturated acyclic hydrocarbon over a 100–200 mesh chromia-alumina catalyst, the mol ratio of sulfur dioxide to hydrocarbon should be at least 0.3, with a space velocity in the range of 0.5 to 2 and a temperature of 700 to 1400° F. With butene it is preferable to conduct the reaction at a mol ratio in the range of 1.5 to 2, a space velocity of about 0.7 to 1.5 and a temperature of around 1000 to 1100° F. It is to be understood that the specific conditions described as optimum are those which result in optimum yields of thiophene in a single pass operation. Where a continuous or recycled process is used, it may be desirable to modify these conditions of reaction in order to obtain an optimum ultimate yield of the desired product.

The catalyst activity for optimum thiophene production will depend to some extent upon the charge stock and reaction conditions employed, but will generally be more than one hour. In any case, periodic determination of thiophene yields would indicate the practical period of catalyst activity before reactivation. When employing butane charge stocks this period will usually be of the order of two to eight hours, after which the thiophene yields will fall off sharply. The catalyst in this condition may be reactivated for thiophene production by conventional methods typical of the type of operation employed.

The thiophene compounds produced by the reaction may be recovered from the reaction products in accordance with conventional methods of extraction. For example, the reaction products which may comprise unreacted charge stocks, cracked products of the charge stock, olefinic compounds, unreacted sulfur oxide and steam, may be passed through a cold caustic soda solution to dissolve sulfur compounds soluble therein and to condense a liquid material containing thiophene compounds which initially may be intimately admixed with the solution. Upon permitting the solution to stand under quiescent conditions, the crude thiophene product separates from the aqueous layer and may be recovered by distillation.

The thiophene compounds may also be recovered in crude form by a simple condensation procedure which involves passing the products into a cooled body of hydrocarbon oil, such as kerosene, in which the thiophene compounds will condense and then recovering the thiophene compounds by distillation. Any unreacted hydrocarbons or olefinic compounds present in the reaction product may be recovered by conventional methods, such as extractive distillation.

It is evident that the process may be operated in accordance with any of the fluid catalyst techniques. Thus, a truly fluid system may be used with continuous reactivation and recycle of a powdered catalyst, or a fluidized fixed bed operation may be used in which the catalyst particles remain in the reaction zone during the alternate reaction and reactivation cycles.

The process of the invention may be further illustrated by the following specific examples conducted in a fluidized fixed bed reactor:

*Example I*

Normal butane and sulfur dioxide in a mol ratio of approximately 1.6 mols of sulfur dioxide per mol of butane were mixed, preheated to approximately 1100° F., and charged to a fluidized fixed bed reaction zone maintained at an average temperature of about 1100° F. and at substantially atmospheric pressure. A commercial pelleted chromia-alumina catalyst containing approximately 10% chromia was ground and screened and 500 grams of 100-200 mesh particles were charged to the reactor. The butane space velocity was approximately 0.76 weight of butane per hour per weight of catalyst. Product samples were taken for two-hour intervals and the thiophene yields were found to remain essentially constant, about 32-35% of the weight of the butane charge for eight hours. At this point the thiophene yields dropped appreciably and were 12% and 0.1% for the fifth and sixth two-hour intervals, respectively.

*Example II*

Normal butane and sulfur dioxide in a mol ratio of approximately 1.7 mols of sulfur dioxide to butane were charged to a reactor containing 250 grams of the chromia-alumina catalyst of Example I, which was ground to 40-100 mesh. The reaction chamber was maintained at about 1100° F. and the butane space velocity was 3.0 weights of butane per hour per weight of catalyst. The run was continued for a period of 80 minutes and the thiophene recovered represented a per pass conversion of butane of 47% by weight.

*Example III*

Butene-2 and sulfur dioxide were charged to a fluidized fixed bed reactor containing the 100-200 mesh chromia-alumina catalyst of Example I at a temperature of about 1100° F. The butene space velocity was 0.75 weight of butene per hour per weight of catalyst and the sulfur dioxide to butene mol ratio was about 1.7. The thiophene yields remained essentially constant for about three hours at a value of about 75% by weight conversion based on the butene charge.

*Example IV*

Normal butane and sulfur dioxide in a mol ratio of approximately 2.5 mols of sulfur dioxide per mol of butane were mixed, preheated to approximately 1100° F. and charged to the reactor containing the 40-100 mesh chromia-alumina of Example II. The reaction zone was maintained at an average temperature of about 1100° F. and at substantially atmospheric pressure. The space velocity was approximately 2.0 weights of butane per hour per weight of catalyst and the run was continued for three hours. The thiophene yields represented a 54% by weight conversion of the butane charge.

*Example V*

Pentene-1 and sulfur dioxide in a mol ratio of sulfur dioxide to pentene of about 1.4 were charged to a reactor containing 100-200 mesh chromia-alumina catalyst of Example I. The temperature of the reaction zone was maintained at about 1000° F., with a pentene space velocity of 1.0 weight per hour per weight of catalyst. A 90 minute run was made during which time the yield of methylthiophene represented a 7.0% by weight conversion of the pentene charge.

*Example VI*

Normal butane and sulfur dioxide in a mol ratio of approximately 1.5 mols of sulfur dioxide per mol of butane were mixed, preheated to approximately 1100° F., and charged to a fluidized fixed bed reactor containing about 290 grams of a 40-100 mesh silica gel catalyst. The temperature of the reaction zone was maintained at about 1100° F. and at substantially atmospheric pressure, with a space velocity of approximately 0.5 weight of butane per hour per weight of catalyst. A two-hour run was made during which time the thiophene recovered represented a 37.3% by weight conversion of the butane charge.

It will be understood that these examples are merely illustrative of the preferred embodiment of the invention and that other catalysts, charge stocks and conditions of reaction may be employed in accordance with the previous description. By using other selected charge stocks thiophene compounds containing various substituents may be produced by the present process. Thus, other acyclic hydrocarbons containing two or more carbon atoms may be employed to produce thiophene itself or thiophene compounds containing acyclic substituents in which the number of carbon atoms in the side chains are dependent upon the number of carbon atoms in the hydrocarbon charge. Furthermore, other organic compounds containing aliphatic chains of two or more carbon atoms may be employed to produce a variety of compounds containing a thiophene nucleus.

Obviously many modifications and variations of the invention as hereinbefore set forth may be made without departing from the spirit and scope thereof, and only such limitations should be imposed as are indicated in the appended claims.

We claim:

1. A process for the production of a compound containing a thiophene nucleus which comprises passing sulphur dioxide and an organic compound selected from the group consisting of hydrocarbons, alcohols and mono-halo hydrocarbons containing an aliphatic chain of at least two carbon atoms at a space velocity of 0.2 to 6.0 weights of organic compound per weight of catalyst per hour into a reaction zone containing a solid particulate contact catalyst, maintaining said catalyst in a fluid state, reacting said sulphur dioxide and said organic compound in the vapor phase at an elevated temperature of at least 700° F. to form said thiophene compound and removing from said reaction zone products of reaction containing said thiophene compound in substantial amount.

2. A process for the production of a compound containing a thiophene nucleus which comprises passing sulphur dioxide and an organic compound selected from the group consisting of hydrocarbons, alcohols and mono-halo hydrocarbons containing an aliphatic chain of at least two carbon atoms at a space velocity of 0.2 to 6.0 weights of organic compound per weight of catalyst per hour into a reaction zone containing a particulate catalyst selected from the group consisting of metal and metaloid oxides, sulfides and mixtures thereof stable under reaction conditions, maintaining said catalyst in a fluid state, reacting said sulphur dioxide and said organic compound in the vapor phase at an elevated temperature of at least 700° F. to form said thiophene compound, and removing from said reaction zone products of reaction containing said thiophene compound in substantial amount.

3. A process according to claim 2 in which the reaction is effected at a temperature between 700 and 1400° F.

4. A process according to claim 2 in which the organic compound is an aliphatic hydrocarbon.

5. A process according to claim 2 in which the catalyst is a group VI metal oxide supported on a surface-active material.

6. A process according to claim 2 in which the catalyst is a group VI metal sulfide supported on a surface-active material.

MAX NEUHAUS.
ROBERT E. CONARY.
LAWRENCE W. DEVANEY.

REFERENCES CITED

The following references are of record in the file of this patent:

UNITED STATES PATENTS

| Number | Name | Date |
| --- | --- | --- |
| 2,126,817 | Rosen | Aug. 16, 1938 |
| 2,370,513 | Amos | Feb. 27, 1945 |
| 2,418,374 | Stone | Apr. 1, 1947 |